Patented Aug. 13, 1929.

1,724,021

UNITED STATES PATENT OFFICE.

HERMAN HEUSER, OF EVANSTON, ILLINOIS, ASSIGNOR TO UNITED STATES PROCESS CORPORATION, A CORPORATION OF ILLINOIS.

CEREAL BEVERAGE AND LIQUID.

No Drawing.   Application filed August 1, 1927.   Serial No. 210,020.

This invention relates to improvements in cereal beverages and liquids such as alcohol-reduced beer, malt tonics and medicinal malt extracts and particularly in the stabilization thereof to prevent the formation of a haze, turbidity, or a sediment in the trade packages.

Various procedures have hitherto been proposed for the stabilization or prevention of haze and turbidity in such materials, particularly when bottled and subjected to greater or less exposure to light or chilled. The methods hitherto proposed have involved the use of proteolytic enzymes, gallotannic acid or hop tannins. Each of these is subject to very serious objections. The proteolytic enzymes, by the same action which is intended to prevent turbidity, alter the constitution of various protein materials in the liquid and injure the foam-producing properties and "body" of the beverage. At the same time, they introduce an additional nitrogenous body, the enzyme itself, which on occasions produces turbidity, particularly when subjected to light action. Gallotannic acid, by its severe precipitant action on proteins, likewise seriously injures the foam-producing properties and "body" of the material and also affects its color by the reaction of the tannic acid with both organic and inorganic constituents of the fermented liquid. Attempts have been made, with only partial success, to modify the action of the gallotannic acids by the simultaneous addition of sulfites, but these have been only partially successful. Hop tannins have been employed and have been found not to be so severe in their precipitant action as the gallotannic acid, but, on the contrary, have been found not to prevent turbidity to a sufficient extent unless used in amounts which caused a deleterious effect upon the taste of the material. In accordance with the present invention, the disadvantages which have existed in connection with the stabilizing materials hitherto known are avoided by the use of small amounts of catechu tannic acid or substances containing substantial quantities thereof, such as the so-called catechu gums.

The catechu tannic acid possesses many distinctive qualities which render it a remarkably useful reagent in the production of a satisfactory cereal liquid of the class described. Catechu tannic acid readily effects the precipitation of proteins of a readily precipitable nature (including glutens) that are liable to cause a haze or sediment in the liquid in the trade packages under storage, exposure to light, or chilling. At the same time, the action of the catechu tannic acid is not so severe as to precipitate useful substances which impart the characteristic taste and flavor and foam-producing properties to cereal beverages and medicinal liquids. It does not cause the precipitation of iron which, as is well known, is a constituent of the beverages, or liquids, of great tonic value. The catechu gum or catechu tannic acid does not possess an objectionable taste and does not detract from the flavor of the beverage or liquid. The foam-producing qualities of the beverage are, in fact, improved by the gummy substances contained in catechu.

The present method is particularly suitable for the treatment of malt extracts or tonics since the amount of protein matter which must be precipitated from such fluids to stabilize them is relatively great, necessitating the use of increased quantities of precipitating agents and rendering completely unsatisfactory precipitating agents such as have been heretofore used with beer, which are much less agreeable than catechu and, in fact, are highly objectionable, especially in the proportions necessary for liquids of high protein content.

The amount of catechu used depends primarily upon the amount of proteins which are to be removed from the liquid. Thus, for ordinary fermented cereal beverages, containing less than 0.5% alcohol and about 0.35 to 0.65% of proteins, 0.008 to 0.015 grams of brown catechu, containing from 35 to 45% of catechu tannic acid, may be used per 100 cc. of beverage with highly satisfactory results. For medicinal malt extracts or malt tonics, catechu is used at the rate of about 0.012 to 0.025 grams per 100 cc. of fluid.

The protein precipitated by the catechu is white in appearance. After settling, it possesses a light pinkish color when brown catechu such as Pegu catechu, Bombay or Bengal catechu is used. When a yellow catechu such as Gambier catechu or cutch is employed, the precipitate is almost white.

Much better results are obtained in the absence of sulfites, particularly as to stabilization against the effect of light. In this respect catechu tannic acid differs markedly from ordinary or gallotannic acid.

The catechu is preferably added in the final stages of the process of manufacture, and suitably simultaneously with carbonation. The catechu dissolves relatively slowly, which aids materially in the production of a uniform precipitate consisting of the more readily precipitated proteins. In the case of dealcoholized beer and the like, it is preferred to allow the haze produced by the catechu to settle for about four to seven days and then to filter. In the case of medicinal malt extracts and malt tonics, the period of settlement may suitably be about ten days or longer.

The invention will be more perfectly understood from the following description of its application to a specific beverage.

A fermented cereal beverage containing a permissible percentage of alcohol and a protein content of about 0.50% is cooled to about 2° C. The catechu is reduced to a powder and added to the beer to the extent of 0.012 grams per 100 cc. The beer is stirred to disperse the catechu uniformly, the stirring being continued until the catechu does not dissolve any further. This takes about one hour. As the catechu dissolves, the beverage acquires a white haze which consists almost completely of readily precipitable proteins, liable to precipitate in the trade packages. The beer is allowed to settle as indicated above, filtered off and packaged. The beer may be carbonated at the time the catechu is added or subsequently.

Although the present invention has been described in connection with the details of a specific example thereof, it is not intended that such details shall be regarded as limitations upon the scope of the invention except in so far as included in the accompanying claims.

I claim:

1. The method of stabilizing alcoholically fermented cereal liquids which consists in incorporating therein a substance containing catechu tannic acid.

2. The method of stabilizing alcoholically fermented cereal liquids which consists in incorporating therein catechu tannic acid in amount at least sufficient to precipitate the readily precipitable protein compounds.

3. The method of stabilizing alcoholically fermented cereal liquids which consists in incorporating therein a catechu gum.

4. The method of stabilizing alcoholically fermented cereal liquids which consists in adding 0.008 to 0.025 grams catchu gum per 100 cc. of liquid, agitating and removing the precipitate.

5. The method of stabilizing alcoholically fermented cereal liquids which consists in cooling the liquid, adding 0.008 to 0.025 of catechu gum grams per 100 cc. of liquid, agitating and removing the precipitate.

6. The method of stabilizing beer which consists in cooling to a low temperature, adding 0.008 to 0.015 grams of catechu per 100 cc. of beverage, agitating and removing the precipitate.

7. An alcoholically fermented cereal liquid containing catechin and a legally permissible proportion of alcohol.

8. An alcoholically fermented cereal liquid containing a legally permissible proportion of alcohol and the soluble, non-reacting constituents of between 0.008 and 0.025 grams of catechu per 100 cc. of liquid and free from substances producing turbidity by the action of light and cold.

HERMAN HEUSER.